United States Patent
Sakamoto et al.

(10) Patent No.: US 9,982,777 B2
(45) Date of Patent: May 29, 2018

(54) ROUGH TERRAIN VEHICLE

(71) Applicant: HONDA MOTOR CO., LTD., Tokyo (JP)

(72) Inventors: Naoki Sakamoto, Wako (JP); Dustin Williams, Marysville, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 0 days. days.

(21) Appl. No.: 15/475,714

(22) Filed: Mar. 31, 2017

(65) Prior Publication Data
US 2017/0284540 A1    Oct. 5, 2017

(30) Foreign Application Priority Data
Mar. 31, 2016  (JP) ................. 2016-072354

(51) Int. Cl.
| F16H 59/44 | (2006.01) |
| F16H 59/50 | (2006.01) |
| F16H 61/02 | (2006.01) |
| B60K 28/02 | (2006.01) |
| B60R 22/48 | (2006.01) |

(52) U.S. Cl.
CPC ......... *F16H 61/0213* (2013.01); *B60K 28/02* (2013.01); *B60R 22/48* (2013.01); *F16H 59/44* (2013.01); *F16H 59/50* (2013.01); *B60R 2022/4816* (2013.01); *B60R 2022/4883* (2013.01); *B60R 2022/4891* (2013.01); *F16H 2061/0227* (2013.01)

(58) Field of Classification Search
CPC ...... F16H 61/0213; F16H 59/44; F16H 59/50; F16H 2061/0227; B60K 28/02; B60R 2022/4816
See application file for complete search history.

(56) References Cited

U.S. PATENT DOCUMENTS 3,939,940 A  *  2/1976  Sasabe ................. B60R 22/48
                                                          180/269
8,548,710 B1 * 10/2013  Reisenberger ......... B60K 28/04
                                                          180/268
(Continued)

FOREIGN PATENT DOCUMENTS

JP      2002-048228 A     2/2002
JP      2004-161135 A     6/2004

OTHER PUBLICATIONS

Office Action dated Aug. 1, 2017, issued in counterpart Japanese Application No. 2016-072354, with partial English translation. (6 pages).

*Primary Examiner* — Huan Le
(74) *Attorney, Agent, or Firm* — Westerman, Hattori, Daniels & Adrian, LLP (57) ABSTRACT

A seat belt attachment determining unit of a rough terrain vehicle determines whether or not a seat belt is being worn by a vehicle occupant. In the case it is determined by the seat belt attachment determining unit that the vehicle occupant is wearing the seat belt, the ECU switches a transmission gear stage of an automatic transmission using a first speed change mode. On the other hand, in the case it is determined by the seat belt attachment determining unit that the vehicle occupant is not wearing the seat belt, the ECU switches the transmission gear stage using a second speed change mode.

6 Claims, 9 Drawing Sheets

(56) References Cited

U.S. PATENT DOCUMENTS

2003/0111286 A1\* 6/2003 Van Houten ............ B60R 22/48
  180/269
2013/0252785 A1\* 9/2013 Kinoshita .............. B60K 28/12
  477/97

\* cited by examiner

ROUGH TERRAIN VEHICLE

CROSS-REFERENCE TO RELATED APPLICATION

This application is based upon and claims the benefit of priority from Japanese Patent Application No. 2016-072354 filed on Mar. 31, 2016, the contents of which are incorporated herein by reference.

BACKGROUND OF THE INVENTION

Field of the Invention

The present invention relates to a rough terrain vehicle which undergoes traveling by transmission of an engine output from the engine to the vehicle wheels through an automatic transmission.

Description of the Related Art

Conventionally, a limitation on the velocity of a vehicle has been carried out by modifying a mechanical mechanism inside the vehicle. For example, in Japanese Laid-Open Patent Publication No. 2004-161135, it is disclosed to restrict the maximum velocity by restricting the angle of rotation of a gear shift cam.

SUMMARY OF THE INVENTION

Incidentally, in a rough terrain vehicle which is capable of traveling on rough terrain, it is optional as to whether a seat belt is worn by the vehicle occupant. However, when future contingencies are taken into consideration, as a seat belt interlock system, it is necessary to take measures in advance to limit the vehicle velocity for times when the occupant is not wearing the seat belt.

However, if the vehicle velocity is limited by modifying a mechanism inside the vehicle, as in Japanese Laid-Open Patent Publication No. 2004-161135, a problem results in that, together with incurring additional costs, the weight of the vehicle increases.

Thus, the present invention has the object of providing, without increasing costs or the weight of the vehicle, a rough terrain vehicle in which it is possible to limit the vehicle velocity at times that the vehicle occupant is not wearing a seat belt.

A rough terrain vehicle according to the present embodiment is adapted to travel by transmitting an output of an engine from the engine to vehicle wheels via an automatic transmission, and further includes the following features listed below.

First Feature: The rough terrain vehicle includes a seat belt attachment determining unit, a first speed change mode, a second speed change mode, and an automatic transmission control unit.

The seat belt attachment determining unit is adapted to determine whether or not a vehicle occupant of the rough terrain vehicle is wearing a seat belt. In the first speed change mode and the second speed change mode, a speed change timing of the automatic transmission is set responsive to the vehicle velocity and a throttle opening.

In the case it is determined by the seat belt attachment determining unit that the vehicle occupant is wearing the seat belt, the automatic transmission control unit switches a transmission gear ratio of an automatic transmission using the first speed change mode. Further, in the case it is determined by the seat belt attachment determining unit that the vehicle occupant is not wearing the seat belt, the automatic transmission control unit switches a transmission gear ratio using the second speed change mode.

Second Feature: In the second speed change mode, a speed change timing responsive to a value of the vehicle velocity is set regardless of the value of the throttle opening.

Third Feature: In the case that the transmission gear ratio is switched using the second speed change mode, the automatic transmission control unit performs switching within a predetermined range of transmission gear ratios.

Fourth Feature: In the case it is determined by the seat belt attachment determining unit that the vehicle occupant is not wearing the seat belt, the automatic transmission control unit prohibits up-shifting of the transmission gear ratio at a vehicle velocity which is greater than or equal to a predetermined restricted velocity.

Fifth Feature: The automatic transmission control unit prohibits up-shifting to a transmission gear ratio that is higher than 3rd speed.

According to the first feature of the present invention, in the case it is determined that the vehicle occupant is wearing a seat belt, a transmission gear ratio of the automatic transmission is switched using the first speed change mode. On the other hand, in the case it is determined that the vehicle occupant is not wearing a seat belt, a transmission gear ratio of the automatic transmission is switched using the second speed change mode. In accordance with this feature, while the mechanism in the vehicle remains unchanged, it is possible to limit the vehicle velocity at times that the vehicle occupant is not wearing a seat belt. As a result, the vehicle velocity can be limited without increasing costs or the weight of the vehicle.

According to the second feature of the present invention, since in the second speed change mode, a speed change timing responsive to a value of the vehicle velocity is set regardless of the value of the throttle opening, it is possible to prevent an unnatural shifting or speed change operation caused by fluctuations in the degree of throttle opening that occur when the vehicle velocity is restricted in accordance with a fuel injection cut.

According to the third feature of the present invention, in the case that the transmission gear ratio is switched using the second speed change mode, switching is performed within a predetermined range of transmission gear ratios. Therefore, while suppressing the occurrence of an unnatural speed change operation, inadvertent switching to a high transmission gear ratio can be avoided. Consequently, it is possible to improve the durability of the clutch that constitutes the automatic transmission, as well as to ensure the cooling capacity of the engine.

According to the fourth feature of the present invention, in the case it is determined by the seat belt attachment determining unit that the vehicle occupant is not wearing the seat belt, up-shifting at a vehicle velocity which is greater than or equal to a predetermined restricted velocity is prohibited. Therefore, while suppressing the occurrence of an unnatural speed change operation, the durability of the clutch and the cooling capacity of the engine can be further enhanced.

According to the fifth feature of the present invention, by prohibiting up-shifting to a transmission gear ratio that is higher than 3rd speed, while suppressing the occurrence of an unnatural speed change operation, the durability of the clutch and the cooling capacity of the engine can be even further enhanced.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of a rough terrain vehicle according to the present invention will be described in detail below with reference to the accompanying drawings.

[Configuration of Rough Terrain Vehicle 10]

Figure 1:
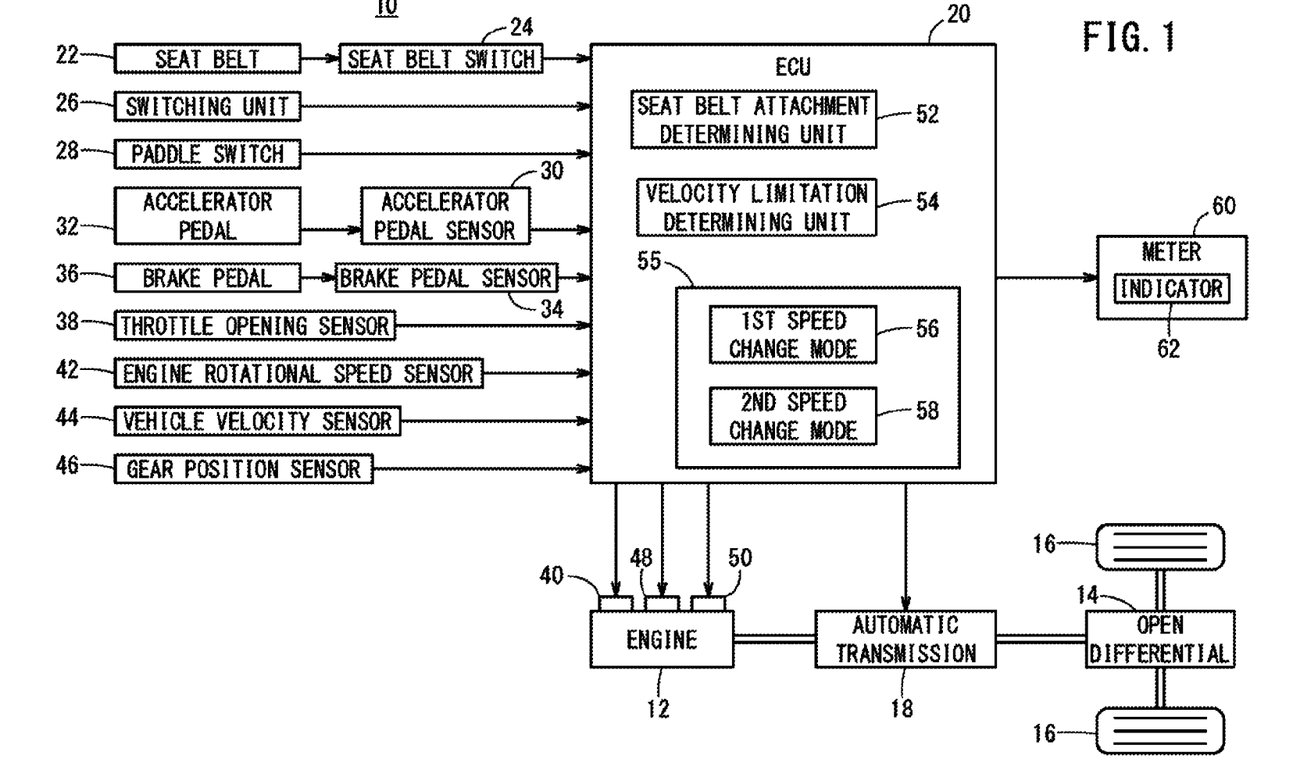
FIG. 1 is a block diagram of a rough terrain vehicle according to the present embodiment.

FIG. 1 is a block diagram of a rough terrain vehicle 10 according to the present embodiment. The rough terrain vehicle 10 further includes an engine 12, and an automatic transmission 18 for transmitting the output of the engine 12 to vehicle wheels 16 via an open differential 14. The structures of the engine 12, the automatic transmission 18, and the open differential 14 are well known, and therefore, detailed descriptions of such features are omitted.

The engine 12 and the automatic transmission 18 are controlled by an ECU 20 (automatic transmission control unit). Detection signals from respective sensors disposed in the rough terrain vehicle 10, and command signals from respective operation units operated by the vehicle occupant are input to the ECU 20. The ECU 20 controls the engine 12 and the automatic transmission 18 on the basis of the detection signals and the command signals. Moreover, the ECU 20 is a computational device including a microcomputer, including as elements thereof a CPU (Central Processing Unit) and a memory, etc. The ECU 20 is capable of implementing the functions described below, by reading in and executing programs recorded in the memory as a non-transitory recording medium.

More specifically, in the case that a seat belt 22 is worn by the vehicle occupant who is seated in a seat, more specifically, if a buckle and a tongue plate of the seat belt 22 are latched, then a seat belt switch 24 outputs to the ECU 20 a seat belt attachment signal indicative of the fact that the vehicle occupant is wearing the seat belt 22.

Further, in the event that a switching unit 26 such as a travel mode changeover switch or the like is operated by the vehicle occupant, the switching unit 26 outputs to the ECU 20 a command signal (mode switching signal) responsive to the operation result thereof. The mode switching signal is a signal for instructing the setting of an automatic transmission mode (AT mode) in which the transmission gear stage (transmission gear ratio) of the automatic transmission 18 is automatically switched, or a manual transmission mode (MT mode) for switching the transmission gear stage manually, in accordance with operations of the switching unit 26 by the vehicle occupant.

Furthermore, in the case that the vehicle occupant, by operating a paddle switch 28, has instructed an up-shift or a down-shift operation with respect to the transmission gear stage of the automatic transmission 18, a command signal (an up-shift signal or a down-shift signal) responsive to the operation result thereof is input to the ECU 20.

An accelerator pedal sensor 30 detects an amount of depression of an accelerator pedal 32 by the vehicle occupant, and outputs the detected amount to the ECU 20. A brake pedal sensor 34 detects an amount of depression of a brake pedal 36 by the vehicle occupant, and outputs the detected amount to the ECU 20.

A throttle opening sensor 38 detects a degree of opening (throttle opening) of the throttle valve 40, and outputs the detected degree of opening to the ECU 20. An engine rotational speed sensor 42 detects the engine rotational speed Ne of the engine 12, and outputs the detected engine rotational speed Ne to the ECU 20. A vehicle velocity sensor 44 detects the vehicle velocity V of the rough terrain vehicle 10, and outputs the detected vehicle velocity to the ECU 20. A gear position sensor 46 detects a transmission gear stage, which is a gear position of the automatic transmission 18, and outputs the detected transmission gear stage to the ECU 20.

On the basis of the respective detection signals from the accelerator pedal sensor 30, the brake pedal sensor 34, the throttle opening sensor 38, the engine rotational speed sensor 42, and the vehicle velocity sensor 44, the ECU 20 adjusts the degree of opening of the throttle, supplies control signals to injectors 48 whereby fuel is injected therefrom, and further supplies ignition signals to an ignition coil 50 in order to ignite the spark plugs.

Further, the ECU 20 also includes a seat belt attachment determining unit 52, a velocity limitation determining unit 54, and a map 55.

The seat belt attachment determining unit 52 determines whether or not a seat belt attachment signal has been input from the seat belt switch 24. In the case that a seat belt attachment signal is input thereto, the seat belt attachment determining unit 52 determines that the vehicle occupant is wearing the seat belt 22, whereas in the case that the seat belt attachment signal is not input thereto, the seat belt attachment determining unit 52 determines that the vehicle occupant is not wearing the seat belt 22. Further, the seat belt attachment determining unit 52 is also capable of determining a failure or malfunction of the seat belt switch 24.

The velocity limitation determining unit 54 determines whether or not the vehicle velocity V should be limited to be less than a predetermined restricted velocity Vr by switching the map 55 to a second speed change mode 58, based on the determination result of the seat belt attachment determining unit 52, or the presence or absence of a component failure of a traveling drive system made up from the engine 12, the automatic transmission 18, the open differential 14, and the vehicle wheels 16, etc. For example, in the case that the vehicle occupant is not wearing the seat belt 22, or if the seat belt switch 24 is malfunctioning, the velocity limitation determining unit 54 switches to the second speed change mode 58, and decides that a velocity limitation with respect to the vehicle velocity V should be implemented.

In addition, the ECU 20 displays the engine rotational speed Ne, the vehicle velocity V, and the transmission gear stage on the screen of a meter 60. Further, a seat belt indicator 62 is provided in the meter 60. In the event that the seat belt attachment determining unit 52 determines that the vehicle occupant is not wearing the seat belt 22, the ECU 20 causes the seat belt indicator 62 to flash, and thereby calls the occupant's attention. On the other hand, if it is determined by the seat belt attachment determining unit 52 that the vehicle occupant has attached or buckled the seat belt 22, the ECU 20 turns off illumination of the seat belt indicator 62 that is in a flashing state.

Figure 2:
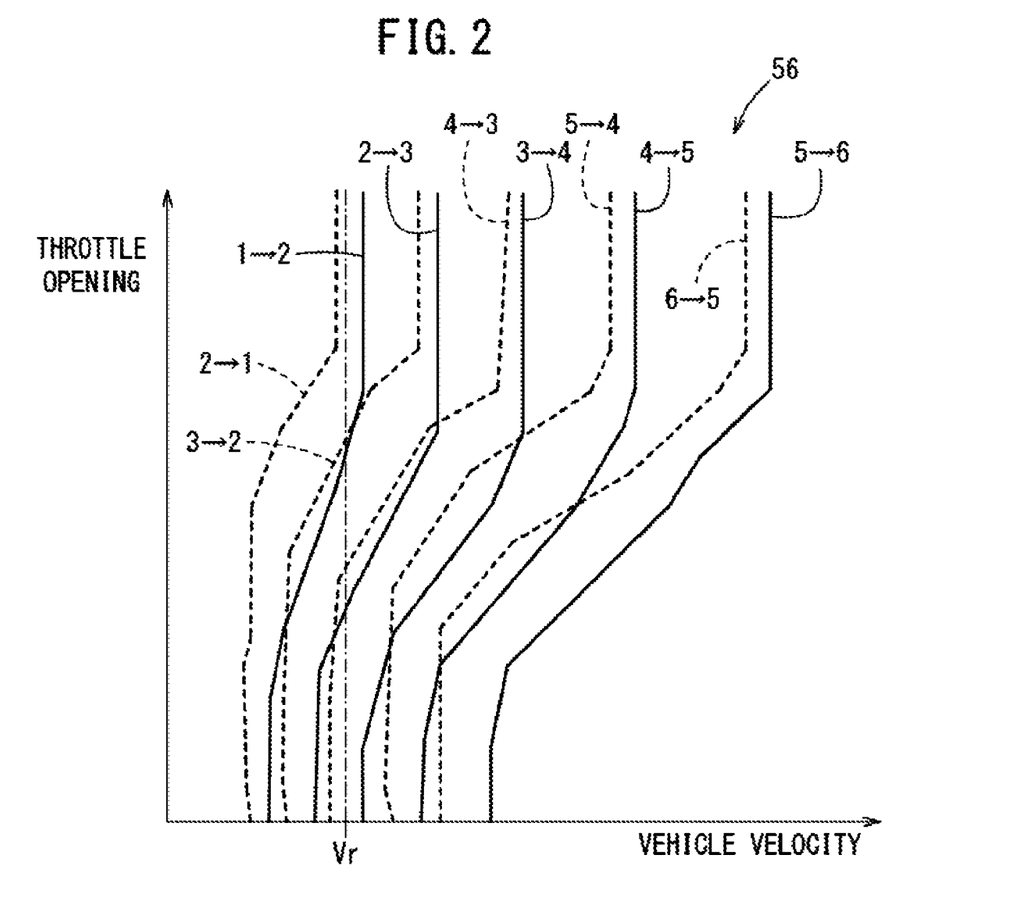
FIG. 2 is a diagram showing a first speed change or shifting mode.
Figure 3:
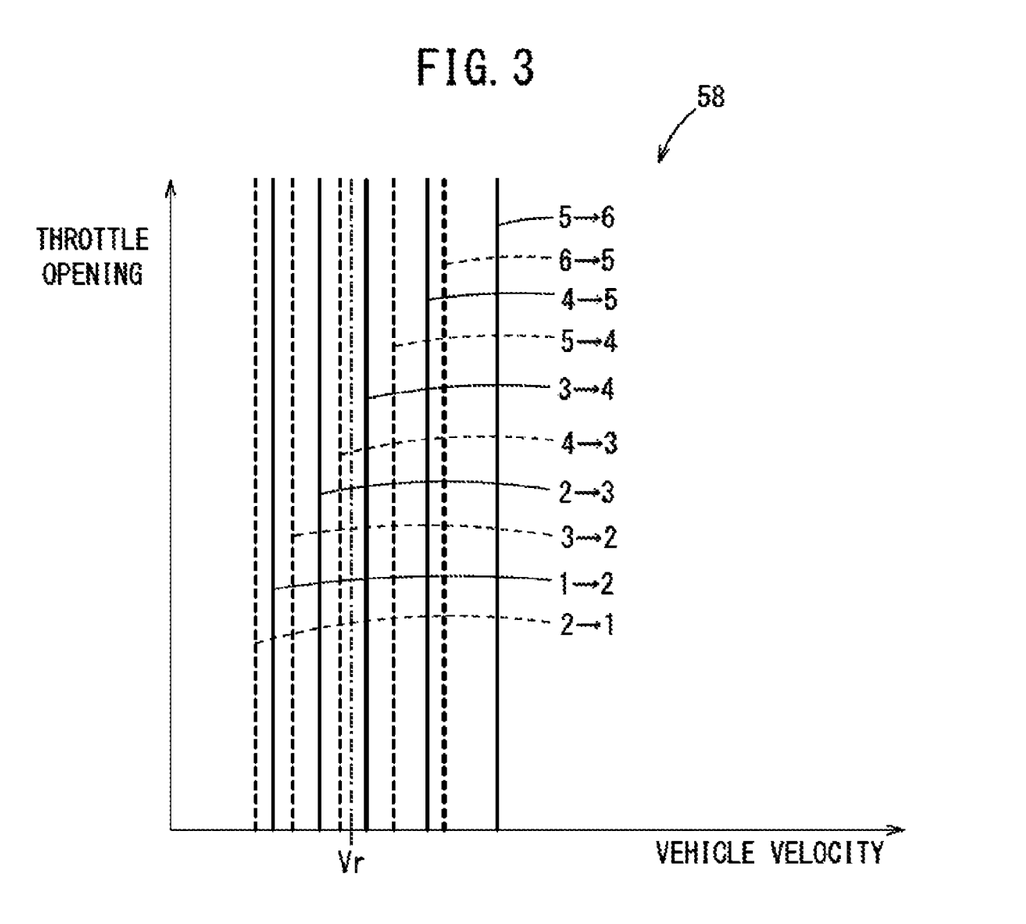
FIG. 3 is a diagram showing a second speed change or shifting mode.

As shown respectively in FIGS. 2 and 3, in the first speed change mode 56 and the second speed change mode 58, a speed change timing of the automatic transmission 18 (see FIG. 1) is set responsive to the vehicle velocity V and the throttle opening. More specifically, the map 55 includes two speed change modes (first speed change mode 56, second speed change mode 58), and concerning the single map 55, the ECU 20 carries out switching to either the first speed change mode 56 or the second speed change mode 58, and thereby switches the transmission gear stage of the automatic transmission 18.

In FIGS. 2 and 3, the solid lines indicate speed change timings (1st speed→2nd speed, 2nd speed→3rd speed, 3rd speed→4th speed, 4th speed→5th speed, 5th speed→6th speed) at which the transmission gear stages of the automatic transmission 18 are switched to a higher speed. On the other hand, the dashed lines indicate speed change timings (6th speed→5th speed, 5th speed→4th speed, 4th speed→3rd speed, 3rd speed→2nd speed, 2nd speed→1st speed) at which the transmission gear stages of the automatic transmission 18 are switched to a lower speed.

In FIGS. 2 and 3, a restricted velocity Vr is indicated by the one-dot-dashed line. In the present embodiment, a control for limiting the vehicle velocity V to be less than the restricted velocity Vr is implemented using the second speed change mode 58. Consequently, it should be noted that, according to the present embodiment, a vehicle velocity limitation using the first speed change mode 56 is not performed. Therefore, the restricted velocity Vr shown in the first speed change mode 56 of FIG. 2 is shown merely for the purpose of comparison with the second speed change mode 58 of FIG. 3.

The first speed change mode 56 of FIG. 2 is used in the event that the seat belt attachment determining unit 52 determines that the occupant is wearing the seat belt 22. On the other hand, the second speed change mode 58 of FIG. 3 is used in the event that the seat belt attachment determining unit 52 determines that the occupant is not wearing the seat belt 22, in which case, regardless of the value of the throttle opening, the speed change timing is set responsive to the value of the vehicle velocity V.

In this case, if the transmission mode is the AT mode, even if either of the first speed change mode 56 or the second speed change mode 58 is used, the ECU 20 executes up-shifting or down-shifting of the transmission gear stage automatically based on (the degree of throttle opening and) the vehicle velocity V.

On the other hand, if the transmission mode is the MT mode, the ECU 20 switches the transmission gear stage of the automatic transmission 18 responsive to an up-shift signal or a down-shift signal from the paddle switch 28. In this case, if an up-shift signal is input, and the vehicle velocity V corresponding to the throttle opening has exceeded one of the speed change timings shown by the solid lines, the ECU 20 causes the automatic transmission 18 to be shifted up. On the other hand, if a down-shift signal is input, and the vehicle velocity V corresponding to the throttle opening falls below one of the speed change timings shown by the solid lines, the ECU 20 causes the automatic transmission 18 to be shifted down.

Further, in the case that implementation of a velocity limitation on the vehicle velocity V is determined by the velocity limitation determining unit 54, in either the AT mode or the MT mode, the second speed change mode 58 is referred to, and up-shifting of the transmission gear stage is prohibited at a vehicle velocity V which is greater than or equal to the restricted velocity Vr. Furthermore, in the case that the transmission gear stage is switched using the second speed change mode 58, up-shifting or down-shifting is carried out within a predetermined transmission gear stage range and at a velocity less than the restricted velocity Vr. With the second speed change mode 58 shown in FIG. 3, up-shifting to a transmission gear stage higher than 3rd speed is prohibited.

[Problems of the Conventional Technology]

Before describing operations of the rough terrain vehicle 10 according to the present embodiment, a description will be made concerning problems encountered in the conventional technology. In the description of such problems, as necessary, descriptions may be given with reference to the constituent elements illustrated in the block diagram of FIG. 1.

Conventionally, as methods for restricting the vehicle velocity V, methods are known in which the output (engine rotational speed Ne) of the engine 12 is decreased, or braking is applied by a vehicle occupant depressing the brake pedal 36. With the method of applying braking, control of the vehicle velocity limitation becomes continuous, and there is a problem in that it is difficult to secure adequate resistance to heat of the components that make up the traveling drive system.

In contrast thereto, in the case that the vehicle velocity V is limited by lowering the output of the engine 12, for example, if a TBW (throttle-by-wire) system is adopted, the output of the engine 12 can easily be decreased. However, it is costly to adopt a TBW system for a vehicle having a simple structure, such as that of the rough terrain vehicle 10. Therefore, depending on the type of vehicle, there are models for which a TBW system cannot be adopted.

In view of these circumstances, in order to reduce the output of the engine 12 without adopting a TBW system, an ignition retard or an injection cut may be implemented. However, if an ignition retard is implemented, for example, a problem occurs in that it is not easy to reduce the output of the engine 12 when the throttle valve 40 is fully opened.

For this reason, in order to limit the vehicle velocity V in a vehicle in which a TBW system cannot be incorporated, such as the rough terrain vehicle 10, it is more desirable to lower the output of the engine 12 by implementing an injection cut. However, when the vehicle velocity V is limited by an injection cut, in the event that the throttle valve 40 is opened and the amount of intake air to the engine 12 is increased, the output of the engine 12 is made to drop by forcibly executing an injection cut. Therefore, when the vehicle velocity V is limited by means of an injection cut, the behavior of the vehicle body of the rough terrain vehicle 10 becomes a problem.

More specifically, in the case that a high vehicle velocity V in excess of the restricted velocity Vr is made to rapidly decelerate to a value less than the restricted velocity Vr, together with implementing the ignition cut, down-shifting is also carried out in sync with the deceleration. Owing thereto, it is considered that the feeling (riding comfort) of the rough terrain vehicle 10 may be improved. However, when carrying out down-shifting corresponding to the throttle opening and the vehicle velocity V using the first speed change mode 56 of FIG. 2, regardless of the fact that the vehicle is in the midst of decelerating in accordance with the ignition cut, both up-shifting and down-shifting take place due to opening and closing of the throttle valve 40, and there is a possibility for the feeling imparted to the vehicle occupant to be adversely affected.

In particular, at a vehicle velocity V in the vicinity of the restricted velocity Vr, an injection cut and restoration of injection are repeated, and the vehicle velocity V experiences a hunting phenomenon. As a result, a defect is caused in that a busy shift period (unnatural speed change operation) results, in which both up-shifting and down-shifting responsive to the vehicle velocity V occur repeatedly over time.

Occurrence of the busy shift period will now be described in greater detail.

For example, in the case of a high vehicle velocity V in excess of the restricted velocity Vr and with the transmission gear stage in 4th speed, when the vehicle velocity V becomes lower than the restricted velocity Vr, the transmission gear stage is down-shifted from 4th speed to 3rd speed. Thereafter, when the vehicle velocity V rises in excess of the restricted velocity Vr, the transmission gear stage is up-shifted from 3rd speed to 4th speed. Thus, the ECU 20 controls the injectors 48 and executes the injection cut, whereupon the vehicle velocity V becomes less than or equal to the restricted velocity Vr. As a result, the transmission gear stage is again down-shifted from 4th speed to 3rd speed. Thereafter, when the vehicle velocity V rises in excess of the restricted velocity Vr, the transmission gear stage is up-shifted again from 3rd speed to 4th speed.

In the foregoing manner, in the case that the rough terrain vehicle 10 is traveling at a vehicle velocity V near to the restricted velocity Vr, when it is attempted to limit the vehicle velocity V using the first speed change mode 56, a busy shift period occurs in which unintentional up-shifting and down-shifting are repeated continuously, and a feeling of discomfort is imparted to the vehicle occupant. In particular, in the event that the vehicle velocity V varies due to an injection cut, or if the vehicle velocity V is restricted on a rough road or an ascending and descending road, a busy shift period is likely to occur.

Figure 4:
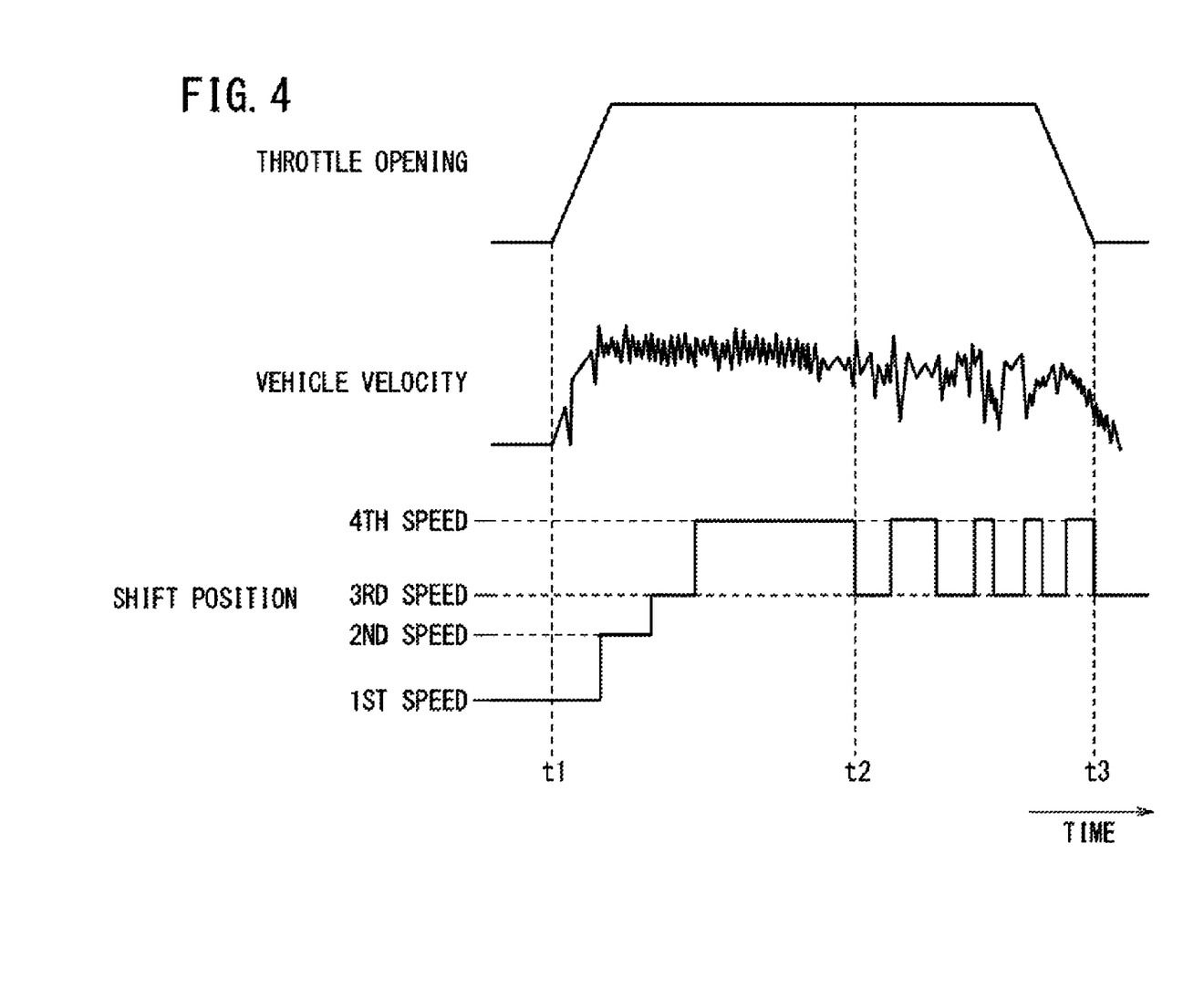
FIG. 4 is a timing chart for describing the occurrence of a busy shift period.

FIG. 4 is a timing chart indicating the occurrence of a busy shift period. At time t1, the throttle opening becomes large, the vehicle velocity rises, and after up-shifting has taken place in which the transmission gear stage changes sequentially in order of 1st speed→2nd speed→3rd speed→4th speed, the velocity limitation is implemented from time t2, whereupon, when the injection cut is carried out, in a time zone from time t2 until time t3, a busy shift period occurs in which the transmission gear stage changes continuously between 3rd speed and 4th speed.

On the other hand, in the rough terrain vehicle according to the conventional art, the regulation with respect to wearing of the occupant's seat belt 22 is arbitrary. However, when future contingencies are taken into consideration, as an interlock system for the seat belt 22, it is necessary to take measures in advance to limit the vehicle velocity V for times at which the vehicle occupant is not wearing the seat belt 22.

Even if such a countermeasure is taken, there is naturally a possibility for the problem of the above-described busy shift period to occur.

[Operations of the Present Embodiment]

Thus, with the rough terrain vehicle 10 according to the present embodiment, in order to resolve the problems indicated above, the operations shown in the flowcharts of FIGS. 5 through 9 are carried out.

Figure 5:
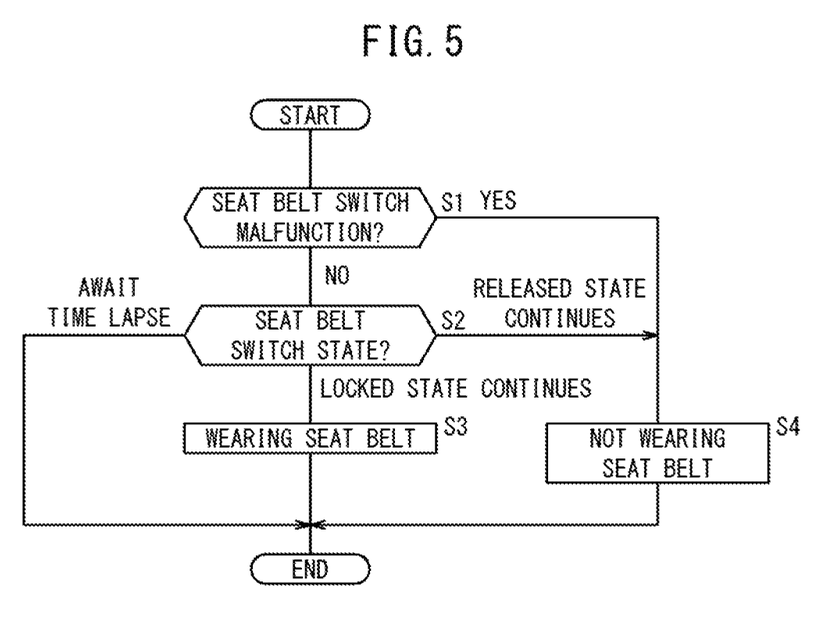
FIG. 5 is a flowchart for determining whether or not a seat belt is being worn.

FIG. 5 is a flowchart for determining whether or not the seat belt 22 is being worn. The subject of such a process is the seat belt attachment determining unit 52. Further, the process of FIG. 5 is performed repeatedly at predetermined time intervals.

In step S1, the seat belt attachment determining unit 52 determines whether or not there is a failure or malfunction of the seat belt switch 24. If there is not a failure of the seat belt switch 24 (step S1: NO), then in the following step S2, the seat belt attachment determining unit 52 confirms whether or not there is an input of a seat belt attachment signal to the ECU 20 from the seat belt switch 24.

In this case, if the seat belt attachment signal continues to be input over a predetermined time period, the seat belt attachment determining unit 52 determines that the buckle and the tongue plate of the seat belt 22 have been latched, that a locked state continues, and that the vehicle occupant is wearing the seat belt 22 (step S3).

Further, if the seat belt attachment signal does not continue to be input over the predetermined time period, the seat belt attachment determining unit 52 determines that the buckle and the tongue plate of the seat belt 22 have not been latched, that a released state of the seat belt 22 continues, and that the vehicle occupant is not wearing the seat belt 22 (step S4).

Furthermore, in the case that the seat belt attachment signal is not input even after the elapse of the predetermined time period, the seat belt attachment determining unit 52 brings the processing cycle of FIG. 5 to an end.

Moreover, in the event that a seat belt attachment signal of a signal level that is not normally possible is input to the ECU 20, the seat belt attachment determining unit 52 determines that the seat belt switch 24 is malfunctioning (step S1: YES), whereupon the process of step S4 is implemented, and it is determined that the vehicle occupant is not wearing the seat belt 22.

Figure 6:
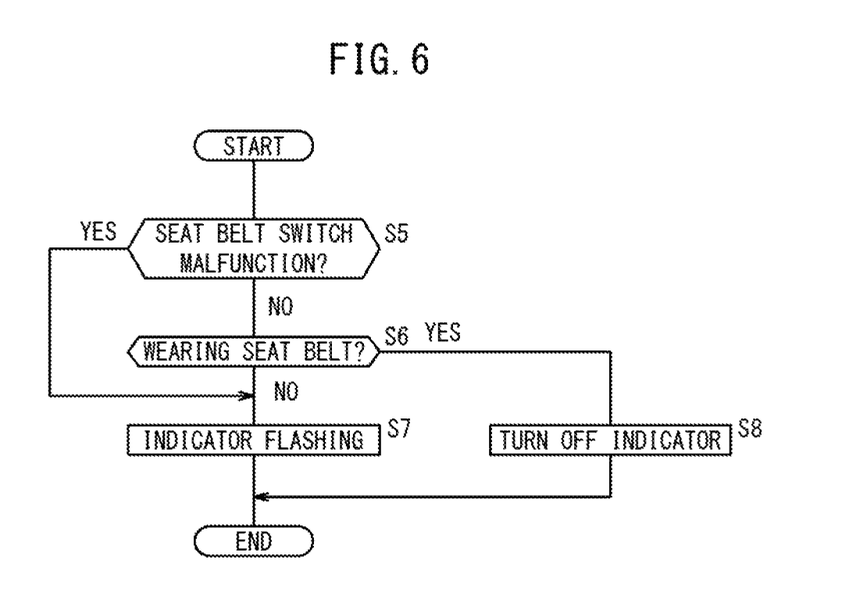
FIG. 6 is a flowchart for determining a display control for a seat belt indicator.

FIG. 6 is a flowchart of a display control process for the seat belt indicator 62. The subjects of such a process are the ECU 20 and the seat belt indicator 62. In the same manner as the process of FIG. 5, this process is performed repeatedly at predetermined time intervals.

In step S5, the ECU 20 confirms whether or not the seat belt attachment determining unit 52 has determined in step S1 of FIG. 5 that there is a failure or malfunction of the seat belt switch 24. If the determination result is to the effect that the seat belt switch 24 is not malfunctioning (step S5: NO), then in the following step S6, the ECU 20 confirms whether or not the seat belt attachment determining unit 52 has determined in step S2 of FIG. 5 that the vehicle occupant is wearing the seat belt 22.

If the determination result is to the effect that the vehicle occupant is not wearing the seat belt 22 (step S6: NO), the ECU 20 causes the seat belt indicator 62 to flash (step S7), and calls the attention of the vehicle occupant so as to prompt the occupant to fasten the seat belt 22. On the other hand, if the determination result in step S6 is to the effect that the vehicle occupant is wearing the seat belt 22 (step S6: YES), the ECU 20 turns off the seat belt indicator 62 (step S8).

Moreover, if the seat belt attachment determining unit 52 determines in step S5 that there is a malfunction in the seat belt switch 24 (step S5: YES), then the ECU 20 implements the process of step S7, and causes the seat belt indicator 62 to flash.

Figure 7:
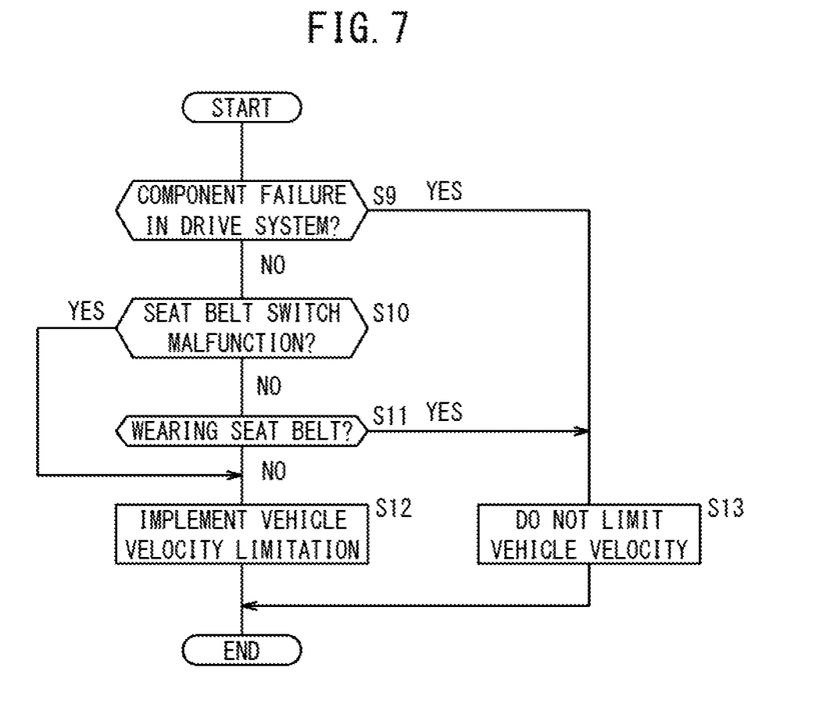
FIG. 7 is a flowchart for specifying a speed change mode to be used when up-shifting or down-shifting.

FIG. 7 is a flowchart for determining whether or not to implement a velocity limitation on the vehicle velocity V using the second speed change mode 58. The subject of such a process is the velocity limitation determining unit 54. In the same manner as the processes of FIGS. 5 and 6, this process is performed repeatedly at predetermined time intervals.

In step S9, the velocity limitation determining unit 54 determines whether or not a failure or malfunction has occurred in a component of the traveling drive system, which includes the engine 12, the automatic transmission 18, the open differential 14, and the vehicle wheels 16, etc. In this case, for example, in the event that a detection signal from at least one of the respective sensors in the rough terrain vehicle 10 is of a signal level that is not normally possible, it is determined that a component failure has occurred.

If the determination result is to the effect that a component failure has not occurred (step S9: NO), then in the following step S10, the velocity limitation determining unit 54 confirms whether or not a failure of the seat belt switch 24 has been determined by the seat belt attachment determining unit 52. If the determination result is to the effect that the seat belt switch 24 is not malfunctioning (step S10: NO), then in the following step S11, the velocity limitation determining unit 54 confirms whether or not it has been determined by the seat belt attachment determining unit 52 that the vehicle occupant is wearing the seat belt 22.

If the determination result is to the effect that the vehicle occupant is not wearing the seat belt 22 (step S11: NO), then in the following step S12, the velocity limitation determining unit 54 decides to implement the process of limiting the vehicle velocity V, using the second speed change mode 58, so as to be less than the restricted velocity Vr. Compared to the first speed change mode 56 of FIG. 2, the second speed change mode 58 of FIG. 3 is capable of limiting (prohibiting) up-shifting, irrespective of the size of the throttle opening, whenever the vehicle velocity V is greater than or equal to the restricted velocity Vr. In the following description, the process of limiting the vehicle velocity V in accordance with the second speed change mode 58 of FIG. 3 may also be referred to as a "vehicle velocity limitation" in certain cases.

If the determination result is to the effect that the vehicle occupant is wearing the seat belt 22 (step S11: YES), then in the following step S13, the velocity limitation determining unit 54 decides to implement up-shifting or down-shifting using the first speed change mode 56 of FIG. 2. More specifically, in step S13, it is determined not to implement the process of limiting the vehicle velocity V (vehicle velocity limitation) using the second speed change mode 58 of FIG. 3.

In step S9, if the determination result is to the effect that a failure has occurred in a component of the traveling drive system (step S9: YES), then the velocity limitation determining unit 54 carries out the process of step S13, and determines not to perform the vehicle velocity limitation using the second speed change mode 58.

Further, in step S10, if the determination result is to the effect that the seat belt switch 24 is malfunctioning (step S10: YES), the velocity limitation determining unit 54 executes the process of step S12, and performs the vehicle velocity limitation using the second speed change mode 58.

Figure 8:
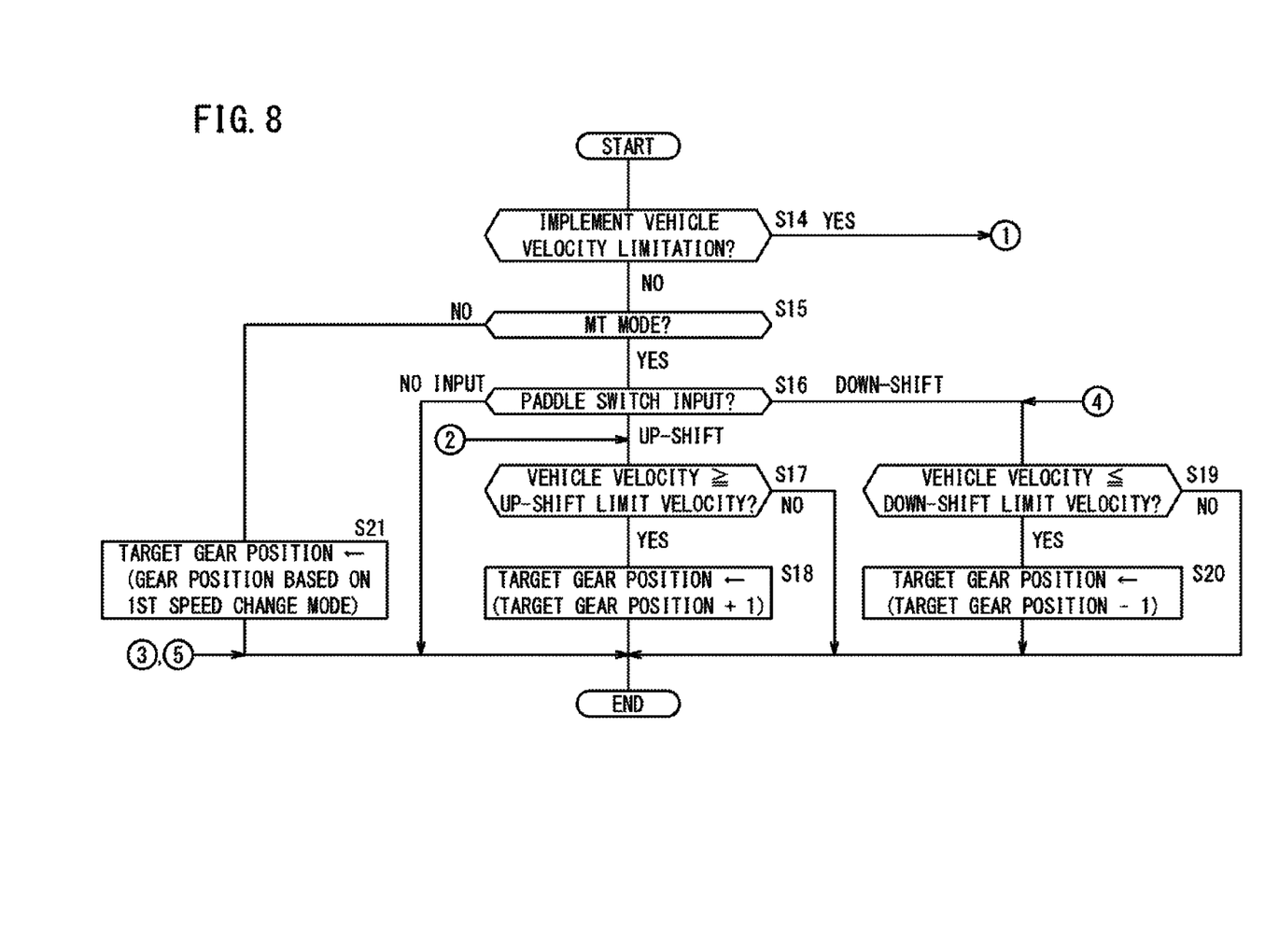
FIG. 8 is a flowchart for describing a shift timing control.
Figure 9:
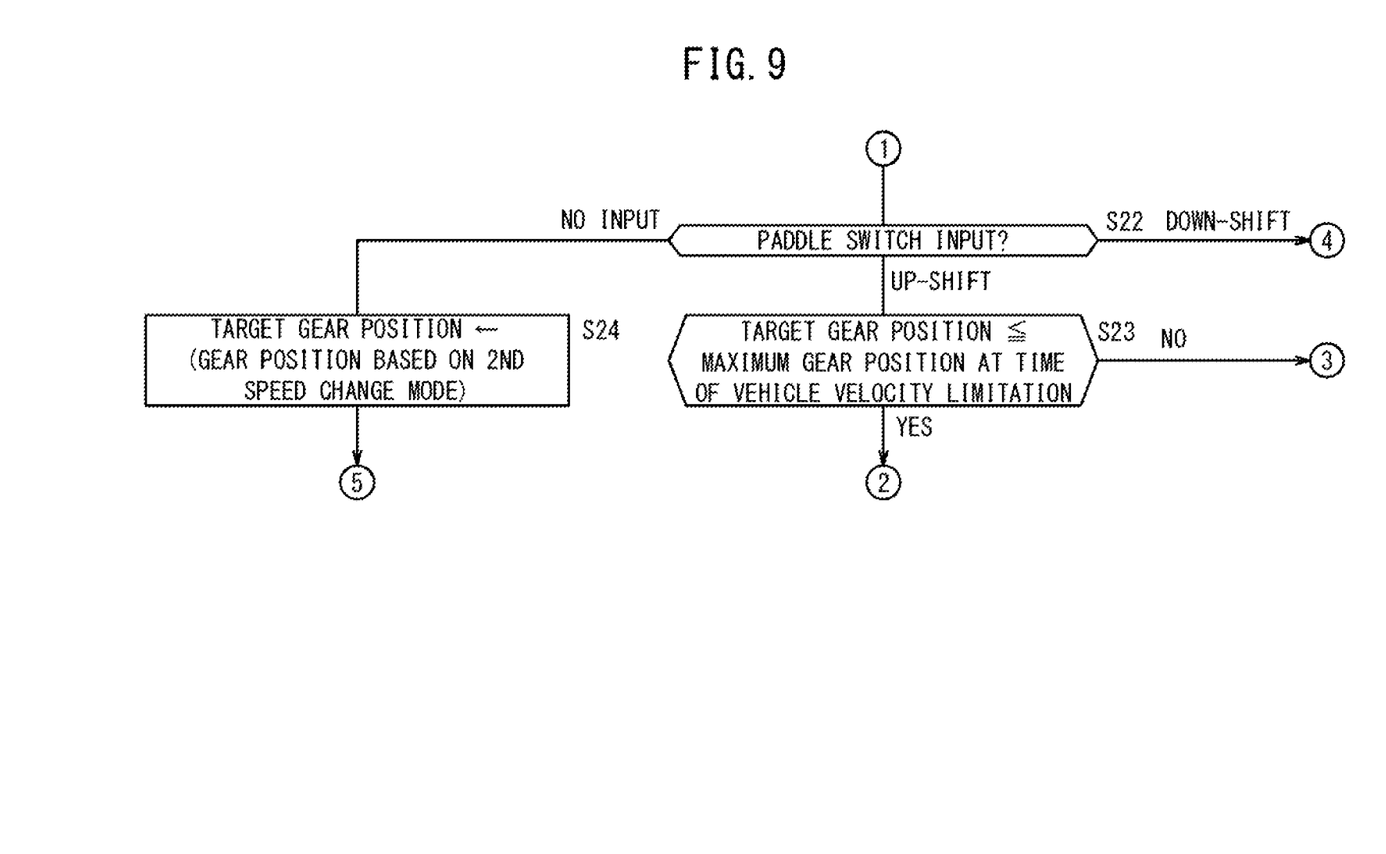
FIG. 9 is another flowchart for describing the shift timing control.

FIGS. 8 and 9 are flowcharts for describing the process of limiting the vehicle velocity V when carrying out up-shifting or down-shifting of the transmission gear stage of the automatic transmission 18. The subject of the process of FIGS. 8 and 9 is the ECU 20. In the process of FIGS. 8 and 9, the process of limiting the vehicle velocity V upon up-shifting or down-shifting is implemented depending on the results of the respective determination processes of FIGS. 5 through 7. In the same manner as the processes of FIGS. 5 through 7, this process is performed repeatedly at predetermined time intervals.

In step S14 of FIG. 8, the ECU 20 determines whether or not to implement the vehicle velocity limitation using the second speed change mode 58 of FIG. 3 when carrying out up-shifting or down-shifting. More specifically, the ECU 20 identifies which one of the processes, i.e., the process of step S12 or the process of step S13 of FIG. 7, was implemented by the velocity limitation determining unit 54.

In the case it is confirmed that the process of step S13 was implemented by the velocity limitation determining unit 54 (step S14: NO), the ECU 20 does not execute the velocity limitation using the second speed change mode 58, but rather determines to carry out up-shifting or down-shifting using the first speed change mode 56 of FIG. 2.

Next, in step S15, the ECU 20 determines whether or not there is input to the ECU 20 from the switching unit 26 a mode switching signal to instruct setting of the MT mode.

If a mode switching signal of the MT mode was input thereto (step S15: YES), then in the following step S16, the ECU 20 determines whether or not an up-shift signal or a down-shift signal was input to the ECU 20 from the paddle switch 28.

If the up-shift signal is input thereto, then in step S17, with reference to the first speed change mode 56 of FIG. 2, the ECU 20 determines whether or not the vehicle velocity V corresponding to the current transmission gear stage and the throttle opening is greater than or equal to the vehicle velocity (up-shift limit velocity) of one of the solid lines corresponding to the speed change timing.

If the vehicle velocity V is greater than or equal to the up-shift limit velocity (step S17: YES), then in the following step S18, the ECU 20 up-shifts the transmission gear stage of the automatic transmission 18 by one speed. On the other hand, if the vehicle velocity V is less than the up-shift limit velocity (step S17: NO), then even if the up-shift signal is input thereto, the ECU 20 does not carry out up-shifting of the transmission gear stage.

On the other hand, if the down-shift signal is input thereto, then in step S19, with reference to the first speed change mode 56 of FIG. 2, the ECU 20 determines whether or not the vehicle velocity V corresponding to the current transmission gear stage and the throttle opening is less than or equal to the vehicle velocity (down-shift limit velocity) of one of the dashed lines corresponding to the speed change timing.

If the vehicle velocity V is less than or equal to the down-shift limit velocity (step S19: YES), then in the following step S20, the ECU 20 down-shifts the transmission gear stage of the automatic transmission 18 by one speed. On the other hand, if the vehicle velocity V exceeds the down-shift limit velocity (step S19: NO), then even if the down-shift signal is input thereto, the ECU 20 does not carry out down-shifting of the transmission gear stage.

In step S16, in the event that an up-shift signal or a down-shift signal is not input to the ECU 20 from the paddle switch 28, the ECU 20 brings the current processing cycle to an end without executing the processes of steps S17 through S20.

Further, in step S15, in the case that a mode switching signal of the AT mode is input to the ECU 20 from the switching unit 26 (step S15: NO), then in the following step S21, with reference to the first speed change mode 56 of FIG. 2, and corresponding to the throttle opening and the vehicle velocity V, the ECU 20 carries out up-shifting or down-shifting of the transmission gear stage of the automatic transmission 18 automatically.

On the other hand, in step S14, in the event that the velocity limitation determining unit 54 has implemented the process of step S12 of FIG. 7 (step S14: YES), the ECU 20 decides to execute the velocity limitation using the second speed change mode 58.

Next, in step S22 of FIG. 9, the ECU 20 determines whether or not an up-shift signal or a down-shift signal was input to the ECU 20 from the paddle switch 28.

If the up-shift signal is input thereto, then in step S23, on the basis of the second speed change mode 58 of FIG. 3 and the current vehicle velocity V, the ECU 20 determines whether or not the transmission gear stage (target gear position) to be up-shifted to is the same or lower than the maximum transmission gear stage (maximum gear position) capable of being set when the vehicle velocity limitation is imposed, and also determines whether or not the vehicle V is less than the restricted velocity Vr.

In FIG. 3, the maximum gear position that can be set below the restricted velocity Vr is 3rd speed. Accordingly, in the case that the second speed change mode 58 of FIG. 3 is used, in step S23, the ECU 20 determines whether or not the vehicle velocity V is less than the restricted velocity Vr, and whether or not the target gear position is 3rd speed or lower.

In the case that the vehicle velocity V is less than the restricted velocity Vr and the target gear position is 3rd speed or lower (step S23: YES), then in step S17 of FIG. 8, and on the basis of the second speed change mode 58 of FIG. 3 and the vehicle velocity V, the ECU 20 determines whether or not the vehicle velocity V corresponding to the current transmission gear stage is greater than or equal to the vehicle velocity (up-shift limit velocity) of one of the solid lines indicating the speed change timing.

If the vehicle velocity V is greater than or equal to the up-shift limit velocity (step S17: YES), then in the following step S18, the ECU 20 up-shifts the transmission gear stage of the automatic transmission 18 by one speed. On the other hand, if the vehicle velocity V is less than the up-shift limit velocity (step S17: NO), then even if the up-shift signal is input thereto, the ECU 20 does not carry out up-shifting of the transmission gear stage.

In step S23, if the vehicle velocity V is greater than or equal to the restricted velocity Vr, or if the target gear position exceeds 3rd speed (step S23: NO), the ECU 20 brings the current processing cycle to an end, and does not carry out up-shifting of the transmission gear stage.

On the other hand, if the down-shift signal is input thereto, then in step S19 of FIG. 8, on the basis of the second speed change mode 58 of FIG. 3 and the vehicle velocity V, the ECU 20 determines whether or not the vehicle velocity V corresponding to the current transmission gear stage is less than or equal to the vehicle velocity (down-shift limit velocity) of one of the dashed lines indicative of the speed change timing.

If the vehicle velocity V is less than or equal to the down-shift limit velocity (step S19: YES), then in the following step S20, the ECU 20 down-shifts the transmission gear stage of the automatic transmission 18 by one speed. On the other hand, if the vehicle velocity V exceeds the down-shift limit velocity (step S19: NO), then even if the down-shift signal is input thereto, the ECU 20 does not carry out down-shifting of the transmission gear stage.

Further, in step S22, in the case that an up-shift signal or a down-shift signal is not input to the ECU 20 from the paddle switch 28, then in the following step S24, the ECU 20 determines that a transmission control in accordance with the AT mode is being implemented, and on the basis of the second speed change mode 58 of FIG. 3 and the vehicle velocity V, carries out up-shifting or down-shifting of the transmission gear stage of the automatic transmission 18 automatically. Moreover, in step S24, it is a matter of course that in the AT mode, together with limiting the vehicle velocity V to be less than the restricted velocity Vr, up-shifting in excess of 3rd speed is prohibited.

[Advantages and Effects of the Present Embodiment]

In the rough terrain vehicle 10 according to the present embodiment, in the case it is determined that the vehicle occupant is wearing the seat belt 22, a transmission gear stage of the automatic transmission 18 is switched using the first speed change mode 56. On the other hand, in the case it is determined that the vehicle occupant is not wearing the seat belt 22, a transmission gear stage of the automatic transmission 18 is switched using the second speed change mode 58. In accordance with this feature, while the mechanism in the vehicle remains unchanged, it is possible to limit the vehicle velocity V at times that the vehicle occupant is not wearing the seat belt 22. As a result, the vehicle velocity V can be limited without increasing costs or the weight of the vehicle.

Further, in the second speed change mode 58, a speed change timing responsive to a value of the vehicle velocity V is set regardless of the value of the throttle opening. Consequently, it is possible to prevent an unnatural shifting or speed change operation caused by fluctuations in the degree of throttle opening that occur when the vehicle velocity V is restricted in accordance with a fuel injection cut. Thus, more natural up-shifting or down-shifting can be brought about. As a result, it is possible to improve riding comfort of the rough terrain vehicle 10 without imparting any feeling of discomfort to the vehicle occupant.

Furthermore, in the case that the transmission gear stage is switched using the second speed change mode 58, switching is performed within a predetermined range of transmission gear stages. Therefore, while suppressing the occurrence of an unnatural speed change operation, inadvertent switching to a high transmission gear stage can be avoided. Consequently, it is possible to improve the durability of the clutch that constitutes the automatic transmission 18, as well as to ensure the cooling capacity of the engine 12.

Further still, in the case it is determined by the seat belt attachment determining unit 52 that the vehicle occupant is not wearing the seat belt 22, up-shifting at a vehicle velocity V which is greater than or equal to the restricted velocity Vr is prohibited. Therefore, while suppressing the occurrence of an unnatural speed change operation, the durability of the clutch and the cooling capacity of the engine 12 can be further enhanced.

In addition, in the second speed change mode 58, since up-shifting to a transmission gear ratio that is higher than 3rd speed is prohibited, the durability of the clutch and the cooling capacity of the engine 12 can be even further enhanced while also suppressing the occurrence of an unnatural speed change operation.

More specifically, if 3rd speed is exceeded, it becomes difficult to ensure the durability of the clutch. On the other hand, if the engine 12 is fixed in 1st speed, since the engine 12 continues to be rotated with a high rotational speed at all times, it becomes difficult to ensure the cooling capacity of the engine 12. Thus, according to the present embodiment, initial starting of the vehicle takes place from 1st speed, and when the vehicle velocity is limited, traveling takes place at a predetermined transmission gear stage (3rd speed), or stated otherwise, a transmission control is carried out within a range that is less than or equal to 3rd speed, thereby preventing an unnatural speed change operation from occurring, while ensuring the durability of the clutch, and also ensuring a suitable cooling capacity of the engine 12.

Although the description of the present invention has been presented above on the basis of a preferred embodiment, the technical scope of the present invention is not limited to the disclosed scope of the above-described embodiment. It will be apparent to those skilled in the art that various improvements or modifications can be made with respect to the aforementioned embodiment. Moreover, it should be evident from the scope of the claims that configurations, which are based on such improvements or modifications, also fall within the technical scope of the present invention. Further, the parenthetical reference characters, which are referred to in the patent claims, correspond with the reference characters shown in the accompanying drawings for thereby facilitating understanding of the present invention. However, the present invention should not be construed as being limited to the elements denoted by such reference characters.

What is claimed is:

1. A rough terrain vehicle adapted to travel by transmitting an output of an engine from the engine to vehicle wheels via an automatic transmission, the rough terrain vehicle comprising:
   a seat belt attachment determining unit configured to determine whether or not a vehicle occupant of the rough terrain vehicle is wearing a seat belt;
   a first speed change mode and a second speed change mode, in which a speed change timing of the automatic transmission is set responsive to a vehicle velocity and a throttle opening; and
   an automatic transmission control unit in which, in the case it is determined by the seat belt attachment determining unit that the vehicle occupant is wearing the seat belt, a transmission gear ratio of the automatic transmission is switched using the first speed change mode, whereas, in the case it is determined by the seat belt attachment determining unit that the vehicle occupant is not wearing the seat belt, the transmission gear ratio is switched using the second speed change mode.

2. The rough terrain vehicle according to claim 1, wherein, in the second speed change mode, a speed change timing responsive to a value of the vehicle velocity is set regardless of the value of the throttle opening.

3. The rough terrain vehicle according to claim 2, wherein, in the case that the transmission gear ratio is switched using the second speed change mode, the automatic transmission control unit performs switching within a predetermined range of transmission gear ratios.

4. The rough terrain vehicle according to claim 3, wherein, in the case it is determined by the seat belt attachment determining unit that the vehicle occupant is not wearing the seat belt, the automatic transmission control unit prohibits up-shifting of the transmission gear ratio at a vehicle velocity which is greater than or equal to a predetermined restricted velocity.

5. The rough terrain vehicle according to claim 4, wherein the automatic transmission control unit prohibits up-shifting to a transmission gear ratio that is higher than a 3rd speed.

6. A control method of a rough terrain vehicle adapted to travel by transmitting an output of an engine from the engine to vehicle wheels via an automatic transmission, the method comprising steps of:
   (i) determining, by using a controller, whether or not a vehicle occupant of the rough terrain vehicle is wearing a seat belt, wherein the rough terrain vehicle including a first speed change mode and a second speed change mode, in which a speed change timing of the automatic transmission is set responsive to a vehicle velocity and a throttle opening; and
   (ii) controlling the automatic transmission, by using the controller, such that, in the case it is determined by the step (i) that the vehicle occupant is wearing the seat belt, a transmission gear ratio of the automatic transmission is switched using the first speed change mode, whereas, in the case it is determined by the step (i) that the vehicle occupant is not wearing the seat belt, the transmission gear ratio is switched using the second speed change mode.

* * * * *